United States Patent

Spahn

(10) Patent No.: US 7,075,061 B2
(45) Date of Patent: Jul. 11, 2006

(54) METHOD OF CALIBRATING A DIGITAL X-RAY DETECTOR AND CORRESPONDING X-RAY DEVICE

(75) Inventor: Martin Spahn, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/946,456

(22) Filed: Sep. 21, 2004

(65) Prior Publication Data

US 2005/0092909 A1 May 5, 2005

(30) Foreign Application Priority Data

Sep. 22, 2003 (DE) ............................. 103 43 787

(51) Int. Cl.
*G01D 18/00* (2006.01)
*G12B 13/00* (2006.01)
*G01T 1/24* (2006.01)
*H01L 25/00* (2006.01)
*H01L 27/00* (2006.01)
*H01L 27/146* (2006.01)
*H05G 1/64* (2006.01)

(52) U.S. Cl. ............................. 250/252.1; 250/370.09; 378/98.8

(58) Field of Classification Search ........... 250/363.09; 382/264

See application file for complete search history.

(56) References Cited

U.S. PATENT DOCUMENTS

| | | | | |
|---|---|---|---|---|
| 5,452,338 A | * | 9/1995 | Granfors et al. | 378/98.11 |
| 5,617,461 A | | 4/1997 | Schreiner | |
| 6,222,901 B1 | * | 4/2001 | Meulenbrugge et al. | 378/19 |
| 6,350,985 B1 | * | 2/2002 | Rodricks et al. | 250/252.1 |
| 6,381,374 B1 | * | 4/2002 | Pourjavid | 382/275 |

FOREIGN PATENT DOCUMENTS

| | | |
|---|---|---|
| DE | 195 27 148 C1 | 1/1997 |
| EP | 1 081 947 A2 | 3/2001 |
| WO | WO 97/0 0573 A2 | 1/1997 |

OTHER PUBLICATIONS

Martin Spahn, Volker Heer and R. Freytag, "Flachbild-detektoren in der Röntgendiagnostik", Der Radiologe 5.2003, Radiologe 2003, Springer Verlag, pp. 340-350.

* cited by examiner

*Primary Examiner*—David Porta
*Assistant Examiner*—Frederick F. Rosenberger

(57) ABSTRACT

In a time-saving method for calibrating a digital X-ray detector (3) of an X-ray device (1), provision is made for a calibration image (K,M), which is intended for linking with an X-ray image (RB) taken by the X-ray detector (3), to be smoothed by applying a filter with regard to the pixel contrast.

8 Claims, 2 Drawing Sheets

METHOD OF CALIBRATING A DIGITAL X-RAY DETECTOR AND CORRESPONDING X-RAY DEVICE

CROSS REFERENCE TO RELATED APPLICATIONS

This application claims priority to the German application No. 10343787.8, filed Sep. 22, 2003 and which is incorporated by reference herein in its entirety.

FIELD OF INVENTION

The invention relates to a method for calibrating a digital X-ray detector. The invention further relates to an X-ray device suitable for carrying out the method.

BACKGROUND OF INVENTION

For many years, most imaging examination processes used in medical technology have been based on X-rays. Digital recording techniques have become increasingly established in recent years, in place of conventional radiography based on photographic films.

SUMMARY OF INVENTION

These digital methods have a considerable advantage in that the time-consuming film development process is no longer required. Instead, images are produced by electronic image processing, which means that the image is ready as soon as it is taken. Digital X-ray methods also offer the advantage of superior image quality, the option of electronically processing the image at a later stage, and the option of dynamic examination, i.e. recording moving X-ray images.

The digital X-ray methods used include so-called image-intensifier camera systems, which are based on television or CCD cameras, memory foil systems with integrated or external readout unit, systems with optical linking to a converter foil on CCD cameras or CMOS chips, selenium-based detectors with electrostatic readout, and solid-state detectors with active readout matrices with direct or indirect conversion of the X-rays.

In particular, solid-state detectors for digital X-ray imaging have been in development for several years. These detectors are based on active readout matrices, e.g. of amorphous silicon (a-Si), which have been precoated with an X-ray converter layer or scintillator layer e.g. of cesium iodide (CsI). The incident X-ray is first converted into visible light in the scintillator layer. The readout matrix is divided into a plurality of sensor areas in the form of photodiodes, which in turn convert this light into electrical charge and store it with spatial resolution. An active readout matrix of active silicon is likewise used in a so-called direct-converting solid-state detector. However, this active read-out matrix is positioned behind a converter layer, e.g. of selenium, in which the incident X-rays are converted directly into electrical charge. This charge is then in turn stored in a sensor area of the readout matrix. For a description of the technical background of a solid-state detector, otherwise known as a flat-tube detector, see M. Spahn et al., "Flachbilddetektoren in der Röntgendiagnostik" [Flat-tube detectors in X-ray diagnostics], Der Radiologe 43 (2003), pages 340 to 350.

The amount of charge stored in a sensor area determines the brightness of a pixel in the X-ray image. Each sensor area in the readout matrix thus corresponds to a pixel in the X-ray image.

One characteristic of an X-ray detector that is critical for image quality is the fact that the detection efficiency of the individual sensor areas varies from one to another to a greater or lesser degree. This is can be seen in that two detector areas deliver pixels with a different brightness level, even if they are irradiated at the same light intensity. The resulting unprocessed X-ray image consequently has a relatively poor image quality due to this fluctuation in brightness (hereinafter referred to as basic contrast). Other factors that contribute to the increase in basic contrast are location-dependent variations in the strength of the scintillator layer, the dependence of the scintillator layer on radiation quality, and non-uniformity of the irradiated X-ray field.

Furthermore, an unprocessed X-ray image also usually displays an irregular "offset brightness" if it was taken in the absence of X-ray light. The primary cause of this is the dark current of the X-ray detector which is always present to a certain extent. Added to this is the residual charge from previously taken X-rays, which has been retained in low power levels (known as "traps") of the detector substrate. Since such residual charge causes outlines of the corresponding X-ray image to be stored in the X-ray detector, and to show up as shadows even on X-ray images taken subsequently, this proportion of offset brightness is also known as the "ghost image artifact". The offset brightness is also affected, for example, by radiant exposure of the detector surface to reset light or by application of bias voltages.

The image quality is also adversely affected by defective sensor surfaces, of which the number present on the readout matrix of a normal X-ray detector usually increases with the machine's life-time. Depending on the type of defect, such defective sensor surfaces deliver pixels with heavily distorted brightness levels, which may occasionally result in an annoying distortion of the X-ray image.

In order to improve the image quality, therefore, it is normal practice to calibrate X-ray detectors. The conventional way of compensating for the basic contrast is to take a calibration image at a constant X-ray exposure, which is also known as the "gain image". This gain image is linked to the X-ray images taken subsequently when the X-ray detector is operating normally, so that the basic contrast present in both images is at least partially off-set.

The offset brightness is usually compensated for in a similar manner. For this purpose, however, an "offset image" is generated as the calibration image. This offset image is taken in the absence of X-rays.

An X-ray image is generally subjected firstly to an offset correction and then to a gain correction. Since a gain image also con-tributes to the offset brightness, gain images are likewise off-set-corrected before being used to correct the X-ray image.

A problem that is traditionally encountered in the calibration of an X-ray detector arises where the calibration images themselves are somewhat "noisy", i.e. they show a pixel contrast caused by occasional noise which fluctuates over time. If the calibration image is now linked to the X-ray images taken subsequently, the noise in the calibration image affects every corrected X-ray image so that the success of the image correction is impaired to a greater or lesser extent. Another term encountered in this context is "fixed-pattern noise", since the noise in the calibration image is deposited as a fixed pattern in every corrected X-ray image.

Until now, fixed-pattern noise has been reduced by taking several calibration images at timed intervals, said images being accumulated to suppress the effects of noise. The disadvantage of this, however, is that—as the number of accumulated calibration images increases—the amount of time required for the calibration processes also increases. Since it is often necessary for a certain time span to elapse between the taking of two calibration images, and since different gain images often have to be generated for different operating modes of the X-ray device, the time needed for calibration may be as long as one or more hours. This loss of time usually represents a serious disadvantage during the operation of an X-ray device.

Also with regard to offset calibration, which is usually carried out automatically in the background while the X-ray device is operating, an accumulation of several calibration images may lead to a noticeable slowing in the operation of the X-ray device, since the rapid time-dependence of the offset brightness means that the offset calibration must be repeated in short cycles lasting a matter of minutes or a few hours.

An object of the invention is to provide an effective and time-saving method for calibrating an X-ray detector. A further object of the invention is to provide an X-ray device in which effective and time-saving calibration of the X-ray detector is facilitated.

These objects according to the invention are achieved by the claims. Pixel contrast is generally defined as the difference in brightness between adjacent pixels.

The invention is based on the underlying consideration that disruptive fixed-pattern noise can be suppressed in a corrected X-ray image by reducing the pixel contrast of the calibration image used for the correction. It is known that the pixel contrast of a calibration image can be obtained by time-averaging across several individual images taken in succession—a method that is convention-ally used—and also by applying a smoothing filter to a calibration image, i.e. by spatial averaging across different pixels of one calibration image. However, whilst the time-averaging method suppresses occasional noise in pixel brightness over time and thus takes greater account of the intrinsic spatial difference in brightness between different pixels, this spatial difference in brightness is necessarily blurred to a certain extent by spatial averaging. In this respect spatial averaging appears to run contrary to the basic principle of detector calibration, since it is intended to determine the spatial difference in brightness for the very purpose of its subsequent compensation. An algorithm that mathematically links the brightness values of various pixels in a calibration image is generally designated as the filter.

However, it has been shown that the linking of an X-ray image with a spatially smoothed calibration image nevertheless enables an improved image quality to be achieved in the corrected X-ray image, since the advantage obtained by reducing the fixed-pattern noise outweighs the inevitable loss in spatial resolution sharpness. Conversely, the method of calibration according to the invention, by maintaining an adequate image quality, enables the number of accumulated calibration images to be reduced or adequate calibration images to be obtained, even with a single shot process. The time required for calibration of the X-ray detector is significantly reduced as a result.

In this context it is important to use a filter that takes into account the basic properties of the detector and the X-ray device. For example, a one-dimensional filter should be used if the calibration image has a systematic row-dependent or column-dependent brightness difference, which is caused by a corresponding detector structure. On the other hand, a two-dimensional filter should be used if the calibration image has non-directional brightness fluctuation, or if it fluctuates over larger distances, due to the detector structure or lack of uniformity in the X-ray field.

In a preferred embodiment of the invention, the spatial averaging of a calibration image by means of a filter is used in advantageous combination with the normally used method of accumulating several calibration images over time. In this embodiment, the filter is alternatively applied to the calibration image which has already been accumulated (and therefore time-averaged) from several individual calibration images, or the individual calibration images may be smoothed by the filter before they are accumulated into a time-averaged calibration image.

In a suitable embodiment the filter conducts a simple averaging of the brightness values of the pixels present in a predefined pixel environment around a pixel under consideration. Depending on the characteristics of the X-ray detector or X-ray device, the use of a one-dimensional or two-dimensional filter is particularly advantageous.

Alternatively, provision is made for further smoothing algorithms that are known per se to be used as filters. In particular, a median filter can also be used to advantage for suppressing detector defects. The use of non-linear or wavelet-based filter algorithms is also possible.

The application, according to the invention, of a smoothing filter to a calibration image, may be used advantageously with regard both to a gain-calibration and to an offset-calibration.

BRIEF DESCRIPTION OF THE DRAWINGS

Exemplary embodiments of the invention are explained in greater detail below with the help of drawings. In these.

The same parts and dimensions are always labeled with the same reference numbers in the diagrams.

DETAILED DESCRIPTION OF INVENTION

Figure 1:
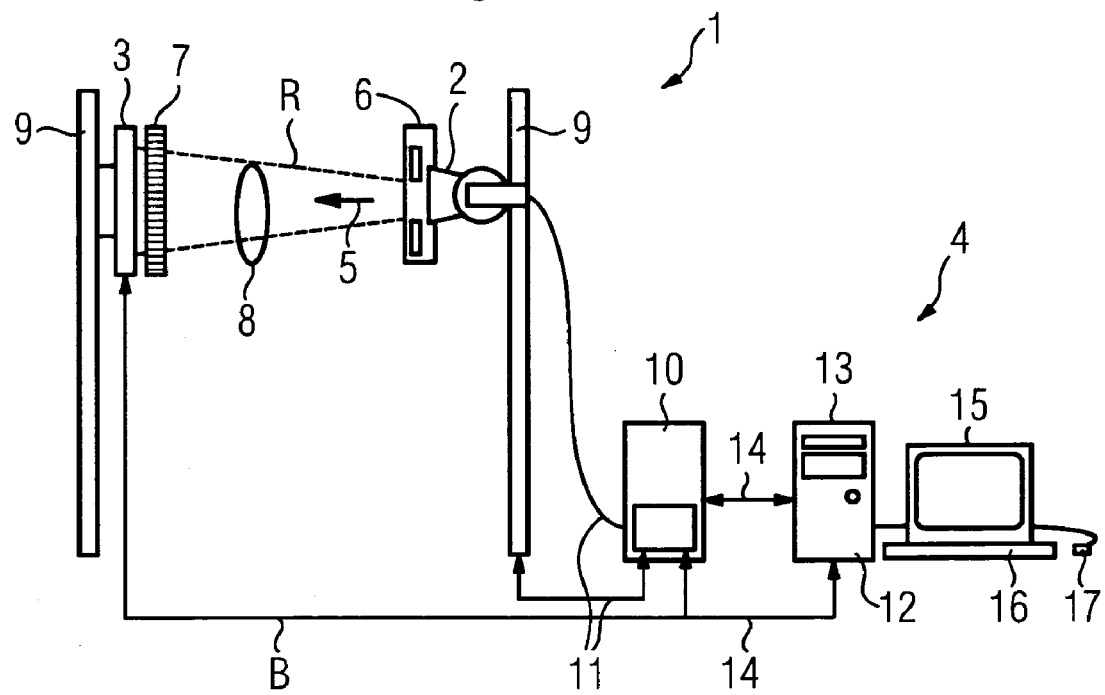
FIG. 1 is a schematic diagram showing an X-ray device with an X-ray detector and an image conversion unit.

The X-ray device 1 illustrated schematically in FIG. 1 incorporates an X-ray emitter 2, a digital X-ray detector 3 and a control and analysis system 4. A multi-leaf collimator 6 and—optionally—an antiscatter grid 7 are arranged in series between the X-ray emitter 2 and the X-ray detector 3. The purpose of the multi-leaf collimator 6 is to cut out a partial bundle of a required size from the X-rays R generated by the X-ray emitter 2. This partial bundle passes through a person 8 or object to be examined and through the antiscatter grid 7, and falls onto the X-ray detector 3. The antiscatter grid 7 is used to mask out lateral radiation leakage, which would distort the X-ray image taken by the X-ray detector 3.

The X-ray emitter 2 and the X-ray detector 3 are adjustably fastened to a support 9 or above and below an examination table.

The control and evaluation system 4 incorporates a control unit 10 for controlling the X-ray emitter 2 and/or the X-ray detector 3 and for generating a supply voltage for the X-ray emitter 2. The control unit 10 is connected to the X-ray emitter 2 via data and power supply lines 11. The control and evaluation system 4 also incorporates an image conversion unit 12, which is preferably a software component of a data processing system 13. The data processing system 13 also contains operating software for the X-ray device 1. The data processing system 13 is connected to the control unit 10 and the X-ray detector 3 via data and system bus lines 14. It is also connected to peripheral devices, in particular a monitor 15, a keyboard 16, and a mouse 17, for the purpose of data input and output.

Figure 2:
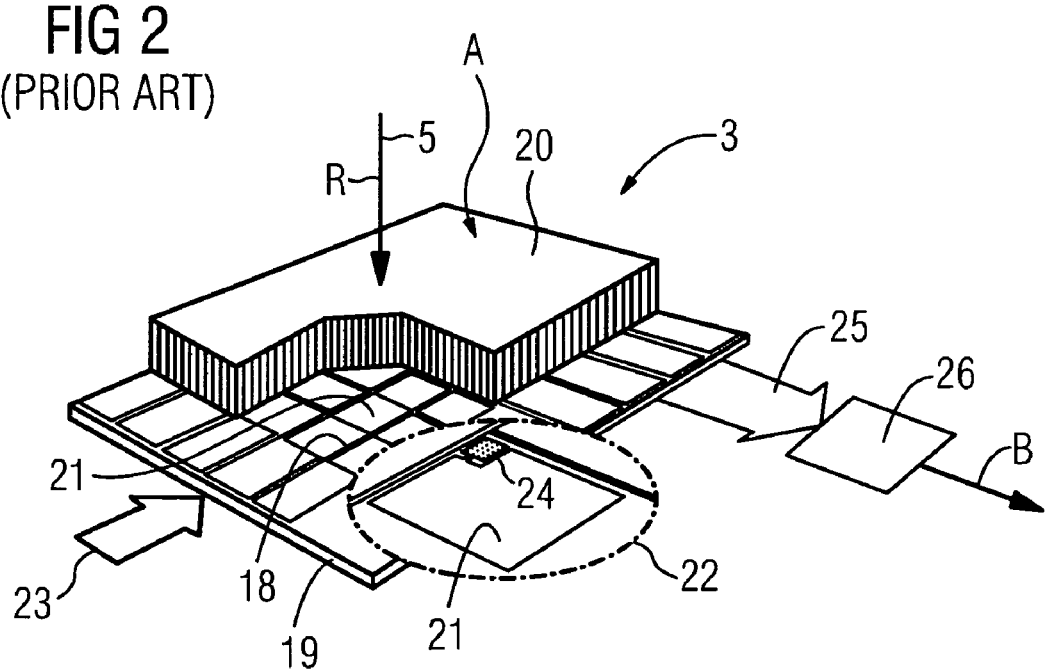
FIG. 2 is a schematic, partially cut-away diagram of the X-ray detector according to FIG. 1.

The X-ray detector 3 illustrated in detail in FIG. 2 is a so-called solid-state detector. It incorporates a two-dimensional active readout matrix 18 of amorphous silicon (aSi), which is placed on a two-dimensional substrate 19. The surface of the readout matrix 18 is referred to below as detector surface A. The readout matrix 18 is in turn covered with a scintillator layer 20 (or converter layer), e.g. of cesium iodide (CsI). In this scintillator layer 20, the incident X-rays R traveling in the radiation direction 5 are converted into visible light, which is converted into electrical charge in sensor areas 21 of the readout matrix 18, said sensor areas being in the form of photodiodes. This electrical charge is in turn stored with spatial resolution in the readout matrix 18. The stored charge, as indicated in the enlarged section 22 shown in FIG. 2, may be read out in the direction of the arrow 25 to an electronic unit 26 (indicated only schematically) by electronic activation 23 of a switching unit 24 assigned to each sensor area 21. The electronic unit 26 generates digital image data B by amplification and analog-digital conversion of the charge read out. The image data B is transferred to the image conversion unit 12 via the data and system bus line 14.

Figure 3:
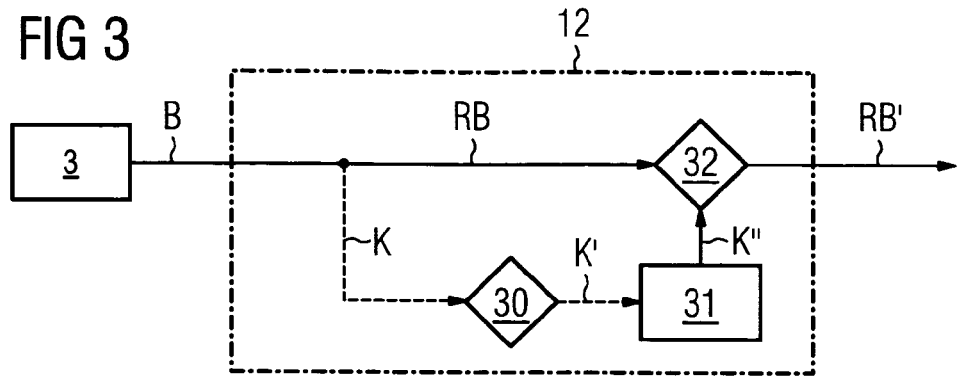
FIG. 3 is a schematic circuit diagram of the X-ray detector and the image conversion unit according to FIG. 1.

A basic outline of the image conversion unit 12 is shown in FIG. 3 in a schematic circuit diagram. This shows the image conversion unit 12 incorporating a filter module 30, a memory module 31 and a correction module 32.

Following calibration of the X-ray detector 3, a calibration image K is taken. The calibration image K may be either a gain image or an offset image. The gain image is generated in the absence of the person 8 or object to be examined, under uniform radiant exposure of the X-ray detector 3 to the X-ray emitter 2. The gain image thus reflects the basic contrast caused predominantly by variations in the detection efficiency of the different sensor areas 21. An offset image, on the other hand, is taken in the absence of X-rays R, i.e. with the X-ray detector 3 unexposed. The offset image reflects the offset brightness caused by dark current effects, ghost image artifacts, etc.

The calibration image K is fed within the image conversion unit 12 to the filter module 30. The filter module 30 smoothes the calibration image K, i.e. it reduces the pixel contrast of the calibration image K by adjusting the brightness value of each pixel of the calibration image K to the mean value of the brightness of a predefined pixel environment of the pixel under consideration. In particular, the filter module 30 contains a one-dimensional filter. The said pixel environment contains a predefined number of adjacent pixels which surround the pixel under consideration within an image row or image column.

Alternatively, however, the filter module 30 may also be implemented as a two-dimensional filter which calculates a mean value across a pixel environment extended over rows and columns.

To prevent this averaging from being corrupted by pixels distorted by defects in the readout matrix 18, the filter module 30 in particular carries out a so-called "truncated mean". In this calculation, pixels having brightness values that deviate from the aver-age by more than a predefined tolerance range are not included in the mean value calculation.

Furthermore, median filters, non-linear smoothing filters or wave-let-based smoothing filters can also be used. Such filter algorithms are already used per se in electronic image processing.

The filter module 30 generates a smoothed calibration image K', which is stored in the memory module 31. While the X-ray device 1 is operating, every recorded X-ray image RB is mathematically linked in the correction module 32, pixel by pixel, to the smoothed calibration image K'. For a gain correction, this linking is normally multiplicative. For an offset correction, however, this linking is normally additive.

By linking the X-ray image RB to the calibration image K', a corrected X-ray image RB' is generated in which the effects of basic contrast or offset brightness are suppressed. The corrected X-ray image RB' is displayed on the monitor 15 or sent to a further image processing operation if appropriate.

Figure 4:
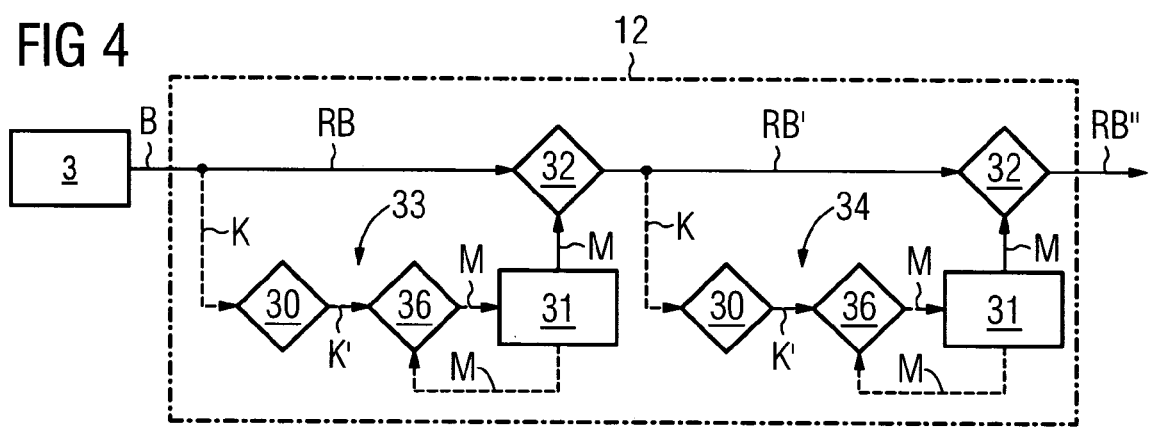
FIG. 4 shows an alternative embodiment of the image conversion unit in an illustration according to FIG. 3.

In practice, the X-ray image RB is subjected both to offset correction and to gain correction. An embodiment of the image conversion unit 12 suitable for this purpose is shown in FIG. 4. In this embodiment, the image conversion unit 12 incorporates a first calibration path 33 for an offset calibration and a second calibration path 34 for a gain calibration. Both calibration paths 33,34 each contain a filter module 30 and a series-connected memory module 31, and function essentially according to the basic outline described above.

According to FIG. 4, however, in addition to the application of the smoothing filter contained in the filter module 30 and the spatial averaging of the calibration image K thereby effected, a time-based averaging process is also carried out. For this purpose, each calibration path 33,34 incorporates an accumulation module 36 connected in series to the filter module 30 and the memory module 31. In this accumulation module 36, several smoothed calibration images K' taken in succession are accumulated, i.e. the mean value is calculated pixel by pixel across the brightness values of the various calibration images K'. The accumulated (and therefore time-averaged) calibration image M is stored in the memory module 31, and made available to the correction module 32.

In order to reduce the calibration time still further, the accumulation of the calibration images K is preferably effected according to the principle of a variably weighted mean value calculation. For this purpose, for each new calibration the previous calibration image M, consisting of "historical" calibration data and stored in the memory module 31, is returned to the accumulation module 36. In the accumulation module 36, each new calibration image K' is linked to the historical calibration image M, e.g. weighted by a weighting factor η according to the equation:

$$M_{(new)} = \eta \cdot K' + (1-\eta) \cdot M_{(old)} \qquad \text{Equation 1}$$

Accordingly, an X-ray image RB taken while the X-ray detector 3 is in operation is subjected first to offset correction according to the sequence of the calibration paths 33 and 34. The offset-corrected X-ray image RB' is gain-corrected and displayed as X-ray image RB". To suppress proportions of the offset brightness in the gain images, these gain images are likewise offset-corrected before their conversion in calibration path 34.

Figure 5:
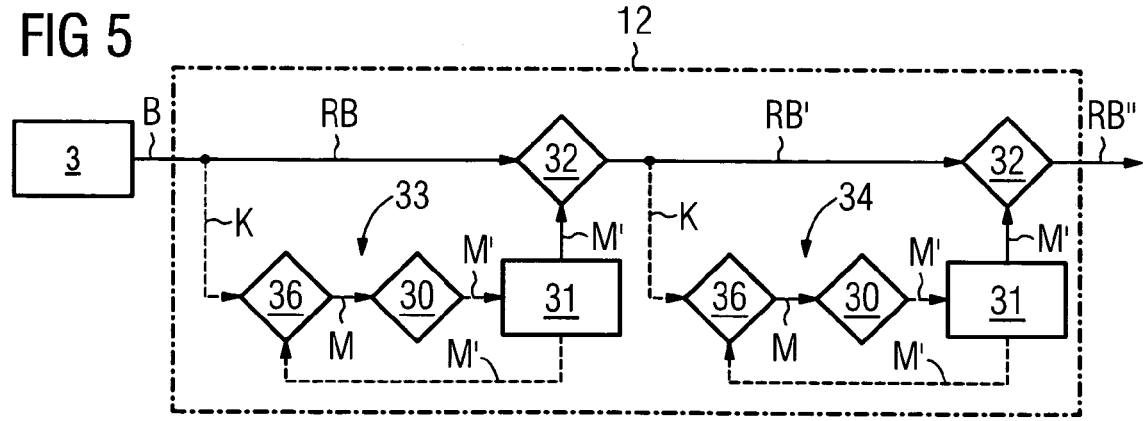
FIG. 5 shows a further embodiment of the image conversion unit in an illustration according to FIG. 3.

The embodiment of the image conversion unit 12 shown in FIG. 5 differs from the embodiment according to FIG. 4 in that the sequence of time-based and spatial averaging of the calibration images K is reversed. According to FIG. 5 one or more calibration images K are first fed to the corresponding accumulation module 36, where they are accumulated, weighted with a historical calibration image M' contained in the memory module 31. The accumulated calibration image M is then fed to the relevant filter module 30. The filter module 30 generates a smoothed, accumulated calibration image M', which is stored in turn in the memory module 31 and used to correct the X-ray images RB while the X-ray device 1 is in operation.

The invention claimed is:

1. A method of calibrating a digital X-ray detector, comprising:
   recording a plurality of calibration images at different points in time;
   smoothing a pixel contrast of each calibration image using a filter;
   merging the plurality of smoothed calibration images into a single time-averaged calibration image; and
   correlating the single time-averaged calibration image with an X-ray image recorded by the X-ray detector.

2. The method according to claim 1, wherein the smoothing includes calculating an average pixel contrast of a one-dimensional area of the calibration image by the filter.

3. The method according to claim 1, wherein the smoothing includes calculating an average pixel contrast of a two-dimensional area of the calibration image by the filter.

4. The method according to claim 1, wherein the filter is a median filter.

5. The method according to claim 1, wherein smoothing the pixel contrast of the calibration image includes waiving such a pixel of the calibration image whose brightness value deviates from a mean brightness value of a predefined area of pixels of the calibration image by more than a predefined value.

6. The method according to claims 1, wherein the calibration image is an offset image.

7. The method according to claims 1, wherein the calibration image is a gain image.

8. An X-ray device comprising:
   a digital X-ray detector;
   an image processing unit for processing an X-ray image recorded by the X-ray detector;
   an adaption module for correlating the X-ray image with a stored calibration image; and
   a filter module for smoothing the calibration image with regard to a pixel contrast, wherein the X-ray detector is configured to record a plurality of calibration images at different points in times,
   the filter module is configured to smooth a pixel contrast of each calibration image,
   the image processing unit is configured to merge the plurality of calibration images into a single time-averaged calibration image, and
   the adaption module is configured to correlate the single time-averaged calibration image with an X-ray image recorded by the X-ray detector, the pixel contrast of each calibration image smoothed using the filter module before merging into the time-averaged calibration image.

* * * * *